United States Patent [19]
Beckwell

[11] 3,910,161
[45] Oct. 7, 1975

[54] CAM PROGRAMMED CONTROL
[75] Inventor: George F. Beckwell, Sugar Grove, Ill.
[73] Assignee: Teledyne Pines, Aurora, Ill.
[22] Filed: Aug. 20, 1973
[21] Appl. No.: 390,160

[52] U.S. Cl. ..................................... 91/375 R; 91/2
[51] Int. Cl.² .............................................. F15B 9/10
[58] Field of Search .................. 91/2, 355, 375, 382

[56] References Cited
UNITED STATES PATENTS

| | | | |
|---|---|---|---|
| 1,910,600 | 5/1933 | Fitch | 91/375 |
| 2,414,690 | 1/1947 | Edwards | 91/2 |
| 3,050,036 | 8/1962 | Faisander | 91/355 |
| 3,103,955 | 9/1963 | Ericsson et al. | 91/355 |
| 3,205,784 | 9/1965 | Ebersold | 91/2 |
| 3,336,776 | 8/1967 | Zerlaut | 72/11 |

*Primary Examiner*—Paul E. Maslousky
*Attorney, Agent, or Firm*—Wegner, Stellman, McCord, Wiles & Wood

[57] ABSTRACT

A position control for a hydraulic motor driven machine element having a servo valve with input and feedback shafts, the valve delivering hydraulic fluid to the motor. Cams are preset for successive positions of the machine element. The hydraulic motor and machine element are connected with the servo valve feedback shaft. A slidable helical gear on the feedback shaft drives a helical gear on the cam shaft while a pair of gears join the cam shaft and the servo valve input shaft. Movement of the machine element is initiated by shifting the helical gear on the feedback shaft to rotate the cam shaft and thus the input shaft. The hydraulic motor drives the machine element and at the same time turns the valve feedback shaft, the cam shaft and the valve input. When the cam follower is actuated by the cam, the cam and input shafts stop and the helical gear is released, returning to its original position as the feedback shaft is driven into alignment with the input shaft. The cam follower is then stepped to the cam controlling the next movement of the machine element. When an operating sequence is completed, the cam follower is returned to its initial position.

26 Claims, 7 Drawing Figures

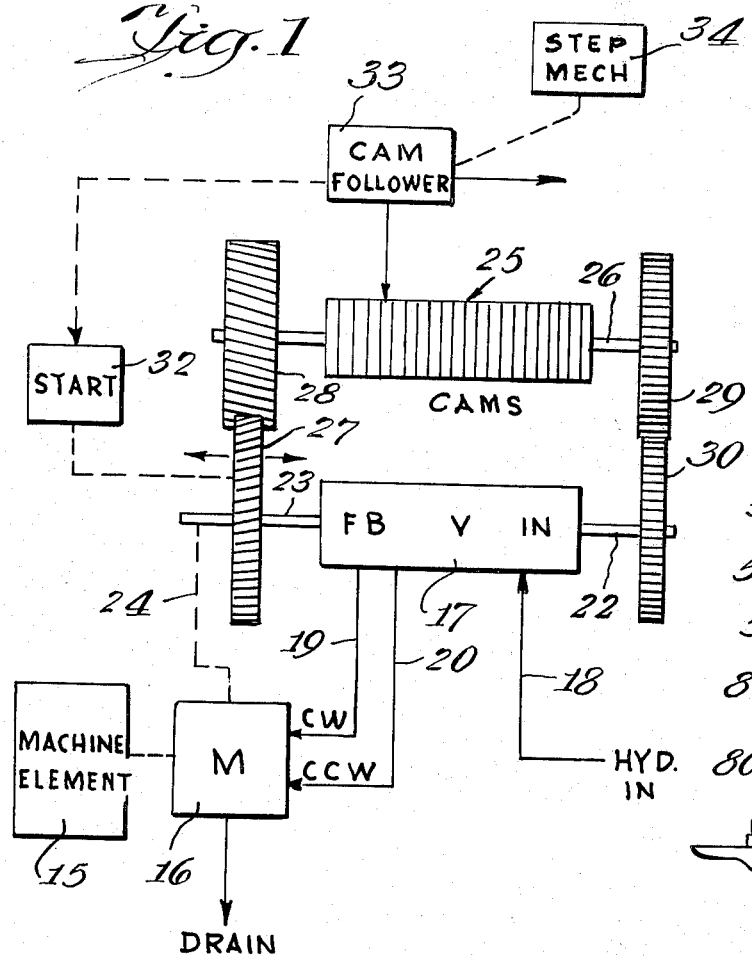
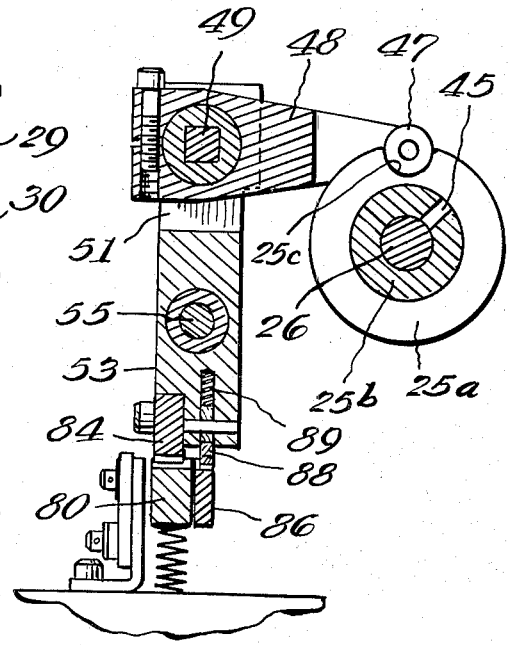
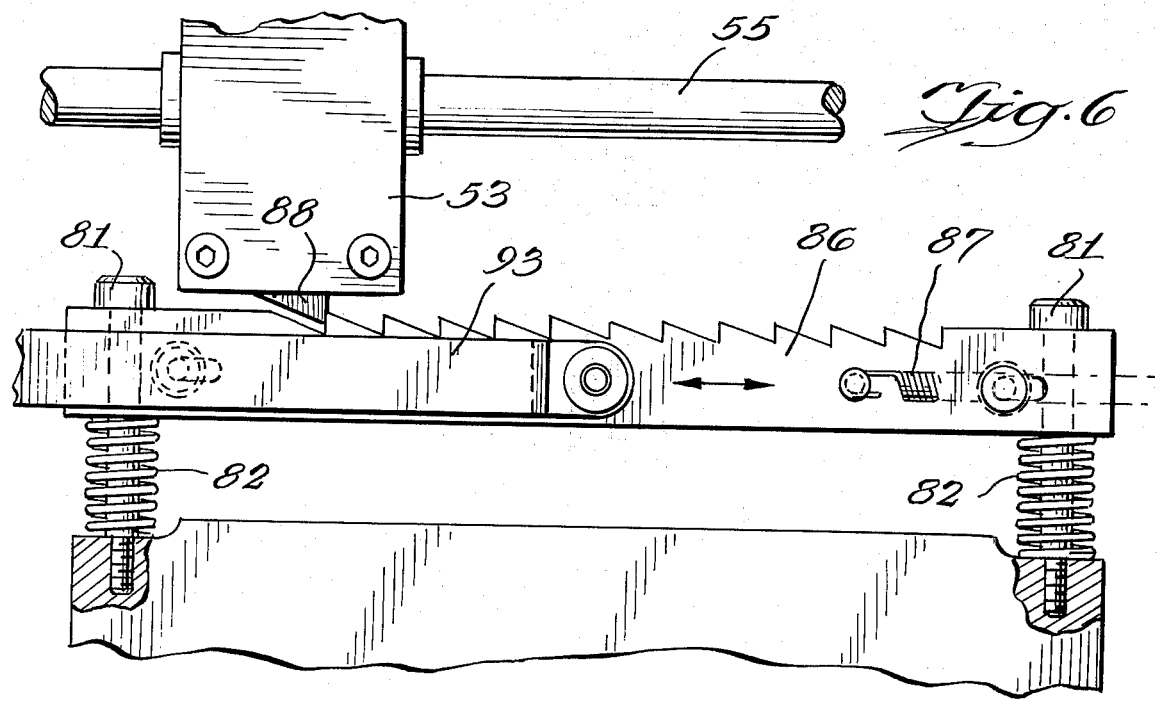

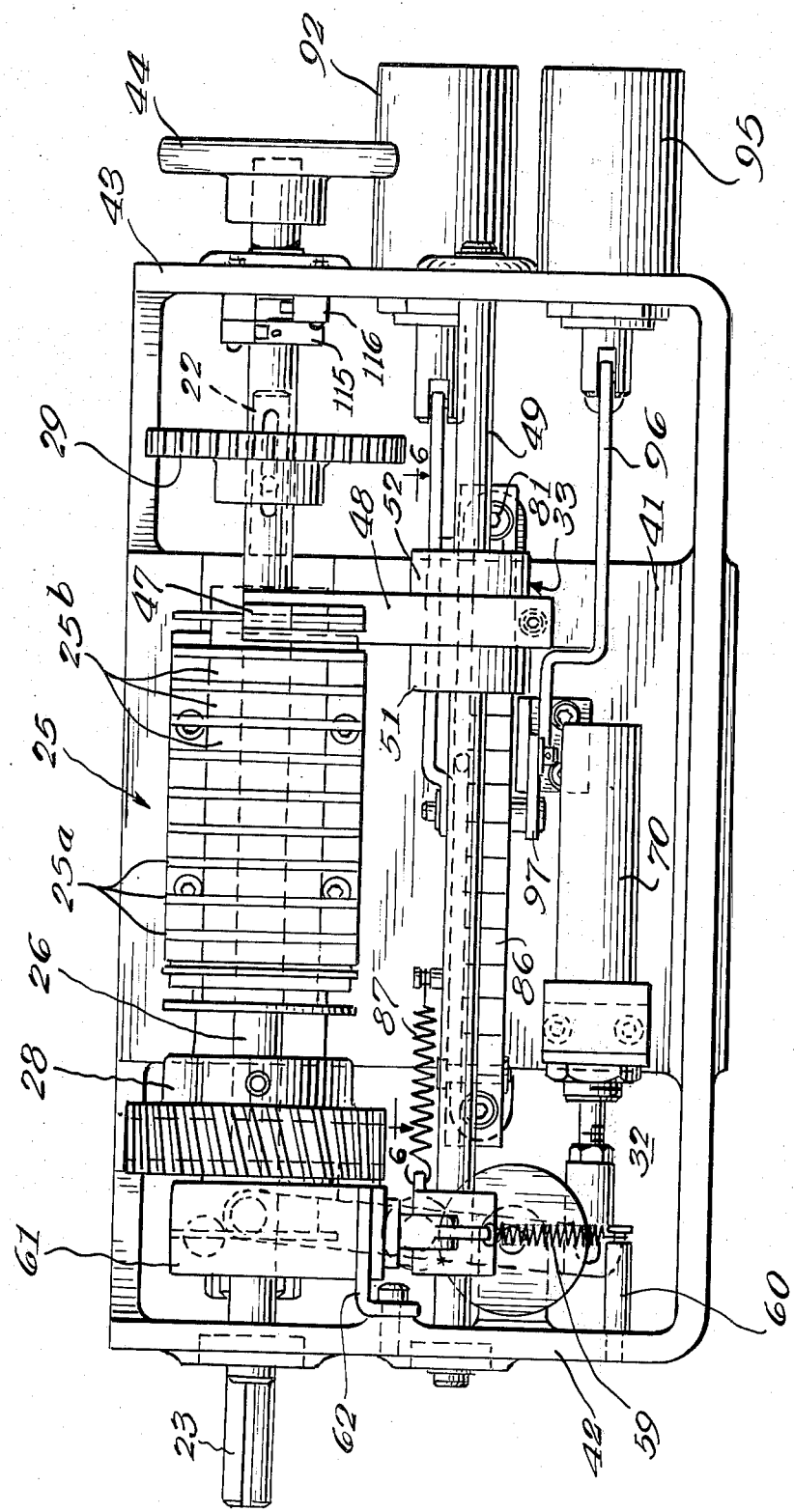

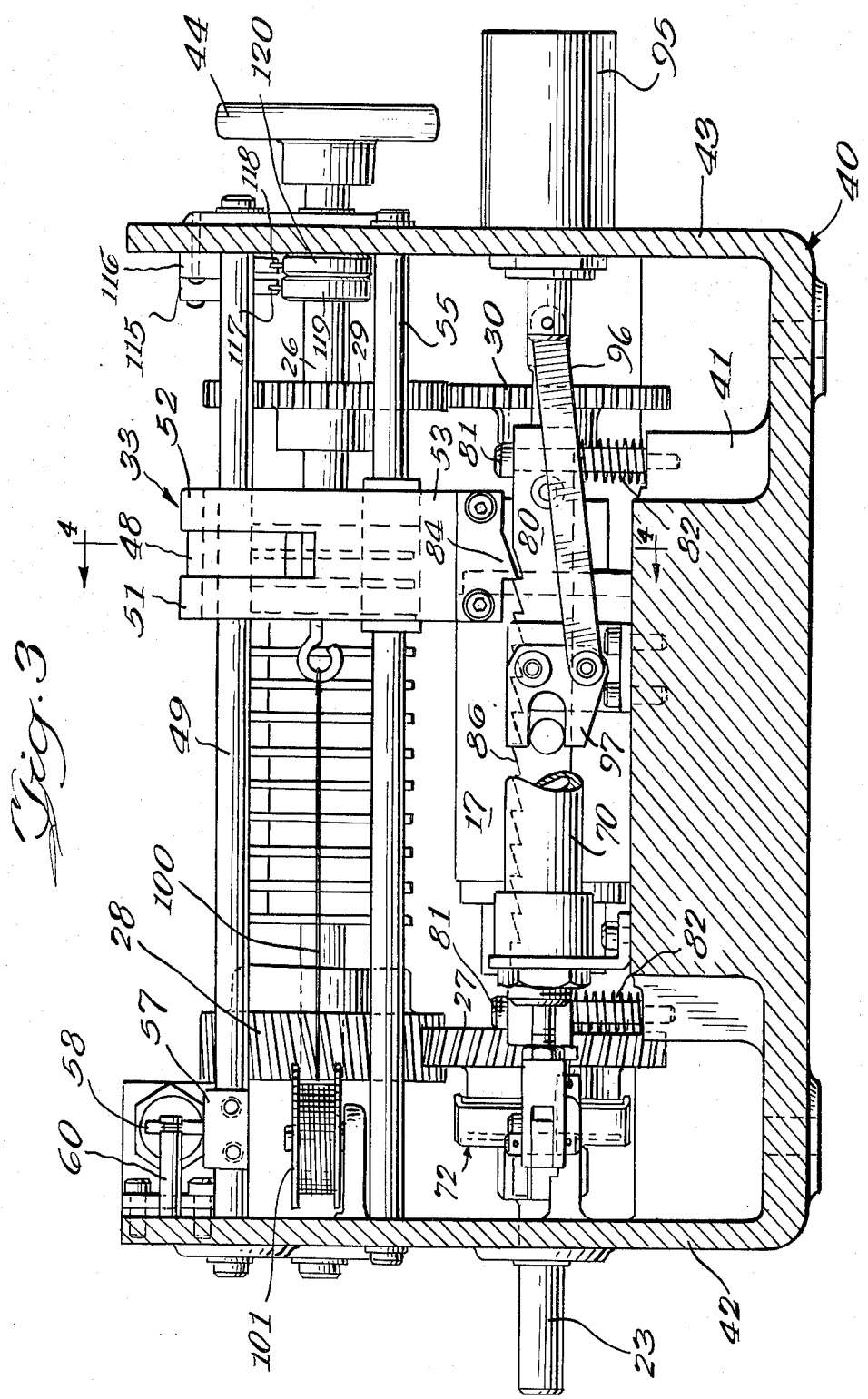

CAM PROGRAMMED CONTROL

This invention is concerned with an automatic control for a motor driven machine element.

Many machines and power tools have a machine element which performs a sequence of movements in carrying out an operating cycle. Where the cycle is one which is repeated, an automatic control permits rapid, accurate operation with little supervision by trained personnel. For example, in a typical machine for bending tubes, the tube is held in a rotatable collet mounted on a carriage movable along the machine frame toward and away from the bend arm. There are three machine element movements of interest for each bend. First, the longitudinal position of the carriage on the frame determines the longitudinal distance of the bend from an end of the tube or from the preceding bend. Second, rotation of the collet establishes the angular plane of the bend. Third, movement of the bend arm forms a bend in the tube of the desired angle of arc.

Automatic controls for the movement of the elements of a tube bending machine have generally been of two types. One utilized mechanical stops, dogs and switches which were physically positioned to sense the movement of the machine element and stop the appropriate drive motor. Space requirements limit such controls to only a few movements. Furthermore, the control is cumbersome and a trained operator must spend a substantial amount of time to make the adjustments and settings necessary for each job. More sophisticated controls have utilized punch tape, magnetic tape or a program stored in a memory to provide automatic control of the machine element movements. These systems generally require a small computer and expensive programing for each part to be made.

I have previously developed a sequential cam control in which each movement of a machine element is controlled by a cam. The cams were driven by a pilot motor and provided an input to a mechanical servo valve. With this system the cam positions were only indirectly related to the machine element, introducing a source of error. A cam follower was used for each cam, multiplying the elements and controls used.

The present invention eliminates the pilot motor and the cams are driven directly by the machine element. The system is more accurate than that of my earlier cam control, uses fewer parts and requires less space on the machine.

One feature of the invention is that a servo control valve with input and feedback shafts has the feedback shaft connected with the machine element and its drive motor. The cam shaft is interconnected between the feedback shaft and the input shaft. Once the relative positions of the machine element and the cam shaft are established, accurate positioning is maintained.

More particularly, the cam control for the motor which moves the machine element to a predetermined position includes a means for controlling delivery of power from the power source to the motor, having first and second rotatable control shafts with delivery of power from the source to the motor being a function of the angular offset between the two shafts. A position control cam is mounted on a rotatable cam shaft which is connected with both the first and second shafts of the power control means. The motor and machine element are connected with the first or feedback control shaft. A start means establishes an offset between the two control shafts to initiate delivery of power to the motor. The motor then drives the first control shaft and through it the cam shaft and the second control shaft. A cam follower stops the cam and the slight continued movement of the motor and machine element realigns the first and second shafts terminating the movement of the machine element.

Another feature of the invention is that the initial offset between the first and second control shafts is established by the axial movement of one of a pair of helical gears.

Preferably the gear mounted on the feedback shaft is slidable thereon and is moved axially to offset the input and feedback shafts starting a programed movement of the machine element.

Yet a further feature is that when the cam follower stops the cam shaft, the axially shifted helical gear is released and continued movement of the machine element brings the feedback shaft into alignment with the input shaft and returns the helical gear to its initial position.

Still another feature is that the control has a plurality of cams on the cam shaft and the cam follower is operatively associated with a selected cam. The cam follower is moved successively to each of the cams, controlling successive movement of the machine element. More particularly, a solenoid actuated reciprocating rack moves the cam follower in stepwise fashion from cam to cam. When an operating sequence is completed, the cam follower is released and returns to its starting position.

Further features and advantages of the invention will readily be apparent from the following specification and from the drawings, in which:

FIG. 1 is a diagrammatic illustration of a machine element position control embodying the invention;

FIG. 2 is a plan view of a cam and hydraulic valve control mechanism;

FIG. 3 is a side elevation of the mechanism of FIG. 2, looking upwardly from the bottom of FIG. 2, with a portion of the frame broken away;

FIG. 4 is a fragmentary section taken along line 4—4 of FIG. 3;

FIG. 6 is a fragmentary detail of the reciprocating rack taken along line 6-6 of FIG. 2 and reversed from FIGS. 2 and 3.

Figure 5:
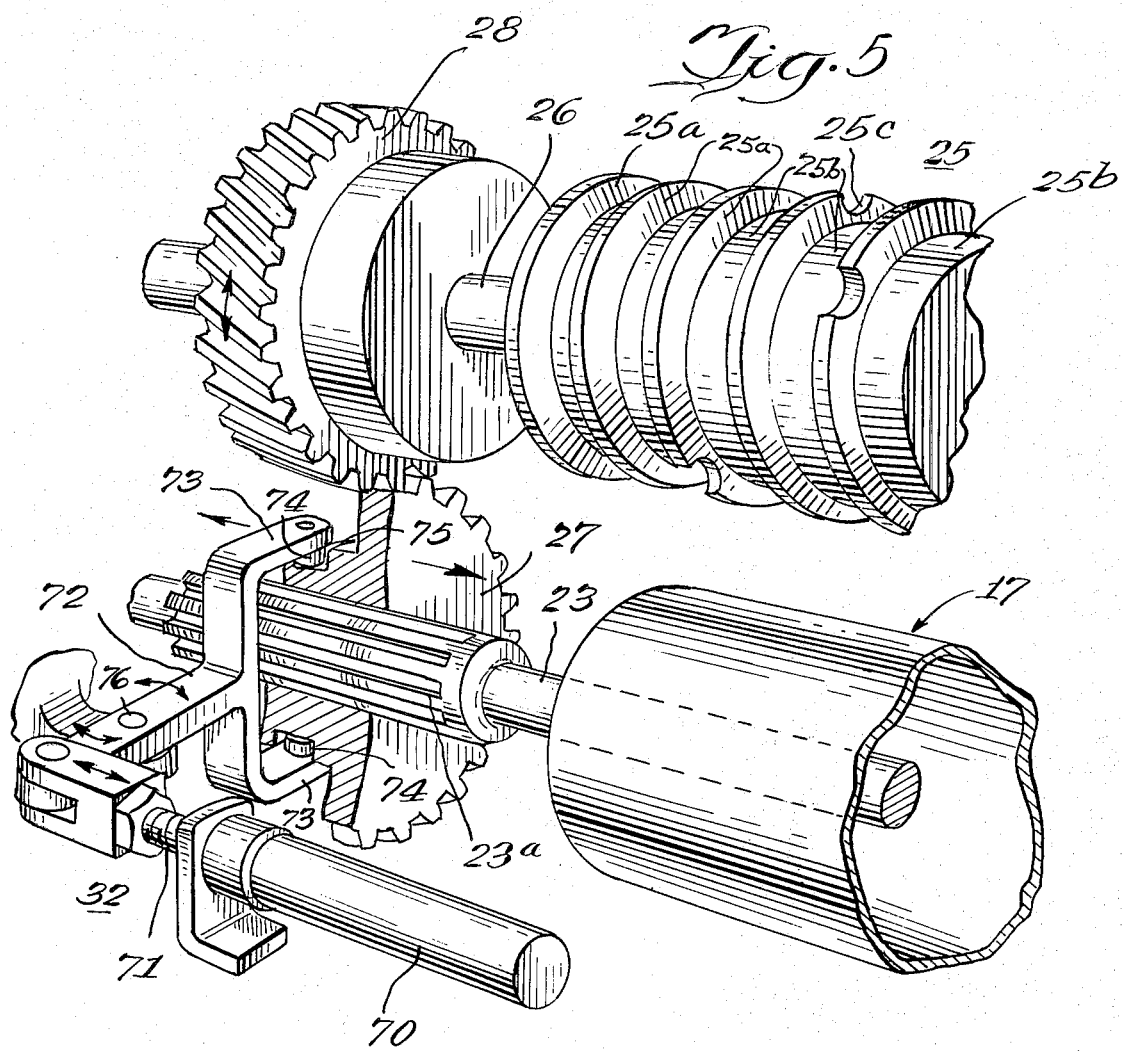
FIG. 5 is a fragmentary perspective of the helical gears and a portion of the cams.

This invention is concerned with a cam programmed power control for the motor which moves a machine element to one or several successive positions. The machine element, the motor and the machine control which initiates each movement are not a part of the invention and are illustrated diagrammatically herein. A functional description of the elements illustrated diagrammatically is included and are exemplary of the function of a typical machine element control system.

Considering first the diagrammatic showing of FIG. 1, machine element 15 is mechanically coupled to and driven by a hydraulic motor 16. The machine element which is controlled may, for example, carry a work piece to be positioned in a particular location or attitude with respect to a tool, or may carry a tool which is moved to a particular position to act on a work piece. An automatic tube bender could utilize three cam controls, one for each of the three variables of each bend.

One is associated with the carriage drive which moves the tube or other work piece longitudinally with respect to the bending tool. The second operates with the motor which rotates the tube holding collet on the carriage, rotating the tube to establish the plane in which the bend is formed. The third variable of the tube bender is angle of movement of the bend arm which wraps the tube about a forming die. Further details of prior automatic tube bender controls may be found in Munro U.S. Pat. No. 3,156,287, Munro et al U.S. Pat. No. 3,553,989, and Suding et al U.S. Pat. No. 3,553,990. Of course, the cam control is not limited to use in a tube bending machine but may be used in other situations where it is desired to move a machine element through a predetermined program of positions.

Motor 16 is hydraulically powered and its operation is controlled by servo valve 17 connected through line 18 with a source of hydraulic fluid under pressure. Hydraulic fluid is delivered from the valve 17 to motor 16 through one of two lines 19, 20 depending on the direction the motor is to operate and the machine element 15 is to move. The hydraulic fluid is returned through a drain connection to a sump (not shown). The motor is illustrated as a rotary device with movements clockwise (CW) and counterclockwise (CCW). The motor might alternatively be a linear device movable forward and backward, depending on the motion requirements of machine element 15.

Servo valve 17 has an input shaft 22 and a feedback shaft 23. The valve characteristic is such that so long as the two shafts are in alignment, there is no output from the valve. When the shafts are not aligned, hydraulic fluid is delivered through one of the lines 19, 20 operating the motor to move the machine element. The motor and the machine element are in turn mechanically connected with the feedback shaft 23 as indicated by broken line 24 so that movement of the machine element is reflected by rotation of the feedback shaft.

A plurality of position control cams 25 are mounted on cam shaft 26 which extends parallel to input and feedback shafts 22, 23. A pair of helical gears, 27, 28 interconnect feedback shaft 23 with cam shaft 26 and a pair of spur gears 29, 30 interconnect the cam shaft with input shaft 22. Helical gear 27 is slidably mounted on feedback shaft 23 and connected thereto by splines which are not shown in FIG. 1.

A brief description of the operation will make the purpose of the various elements apparent. The movement of the machine element 15 is initiated by a start mechanism 32 which mechanically moves helical gear 27 in one direction or the other on feedback shaft 23 as indicated by the arrows. The feedback shaft is restrained from rotating by its mechanical coupling with machine element 15 and motor 16. The axial movement of helical gear 27 thus imparts rotation to helical gear 28 and through it to cam shaft 26, cams 25, spur gears 29, 30 and servo valve input shaft 22. The offset thus established between input shaft 22 and feedback shaft 23 causes hydraulic fluid to flow through the appropriate line 19 or 20 to motor 16, to drive the machine element in the desired direction. Feedback shaft 23 turns in accordance with the movement of the machine element and, through gears 27, 28 the cam shaft 26, and gears 29, 30 causes input shaft 22 to turn. This relationship maintains the offset between the input and feedback shafts so that motor 16 and machine element 15 continue to operate at a constant speed.

During operation of motor 16, cam follower 33 is in engagement with one of the plural cams 25. The cam and cam follower have surfaces which interengage when the machine element and thus the cam shaft reach a predetermined position, stopping rotation of the cam shaft. At the same time, the start mechanism 32 which initiated the axial shift of helical gear 27 is released allowing the gear to return to its initial position. As this occurs the feedback shaft 23 once again is aligned with input shaft 22 and the flow of hydraulic fluid to motor 16 is terminated. A step mechanism 34 moves cam follower 33 to the next selected cam ready to control the next movement of machine element 15. When the operating sequence is completed, cam follower 33 is returned to its initial position and the sequence may be repeated.

Each of the plurality of cams 25 is rotationally adjustable on cam shaft 26. The control may readily be programed by manually operating motor 16 to move machine element 15 through its desired operating cycle with helical gear 27 in its central position. The appropriate cam is rotationally positioned on the cam shaft 26 for each position of the machine element 15.

The cams, cam follower and valve together with the associated operating mechanisms are illustrated in more detail in FIGS. 2 and 3. A frame 40 has a base portion 41 on which valve 17 is mounted. Inlet and outlet ports for the valve may be connected through passageways (not shown) in the base. Frame end plates 42 and 43 have the cam shaft 26 journaled therein. One end of the cam shaft exteends outwardly beyond end plate 43 and a manual operating wheel 44 is mounted thereon. Feedback shaft 23 extends outwardly through end plate 42 for mechanical connection with machine element 15 and motor 16.

Each of the cams 25a has a collar 25b with a set screw 45 (FIG. 4) or other suitable means for adjustably locking the cams in a desired angular relationship on cam shaft 26. Cam follower roller 47 is carried at the end of arm 48 slidably mounted on square index shaft 49 which is journaled in bearings in end plates 42, 43. Follower arm 48 is carried between the bifurcated legs 51, 52 of a guide 53 slidably mounted on index shaft 49 and guide shaft 55.

Roller 47 rides on the periphery of cam 25a as the cam turns. A semicircular recess 25c in the cam periphery receives the roller 47 allowing arm 48 to swing toward the cam shaft 26, turning index shaft 49 in a clockwise direction as viewed in FIG. 4. The interengagement of the roller and recess stops rotation of the cam and cam shaft.

A bracket 57 on index shaft 49 has an upstanding arm 58 to which is secured an index arm return spring 59 anchored to a pin 60 mounted on end plate 42. Spring 59 rotates index shaft 49 in a counterclockwise direction as viewed in FIG. 4, tending to lift arm 48 and roller 47 from cam 25a. Solenoid 61 mounted on a bracket 62 secured to end plate 42 is connected with arm 58 and when energized pulls the index arm against the action of spring 59 in a clockwise direction. This holds the cam roller 47 against the surface of the cam and causes it to drop into recess 25c as the cam shaft rotates.

Figure 7:
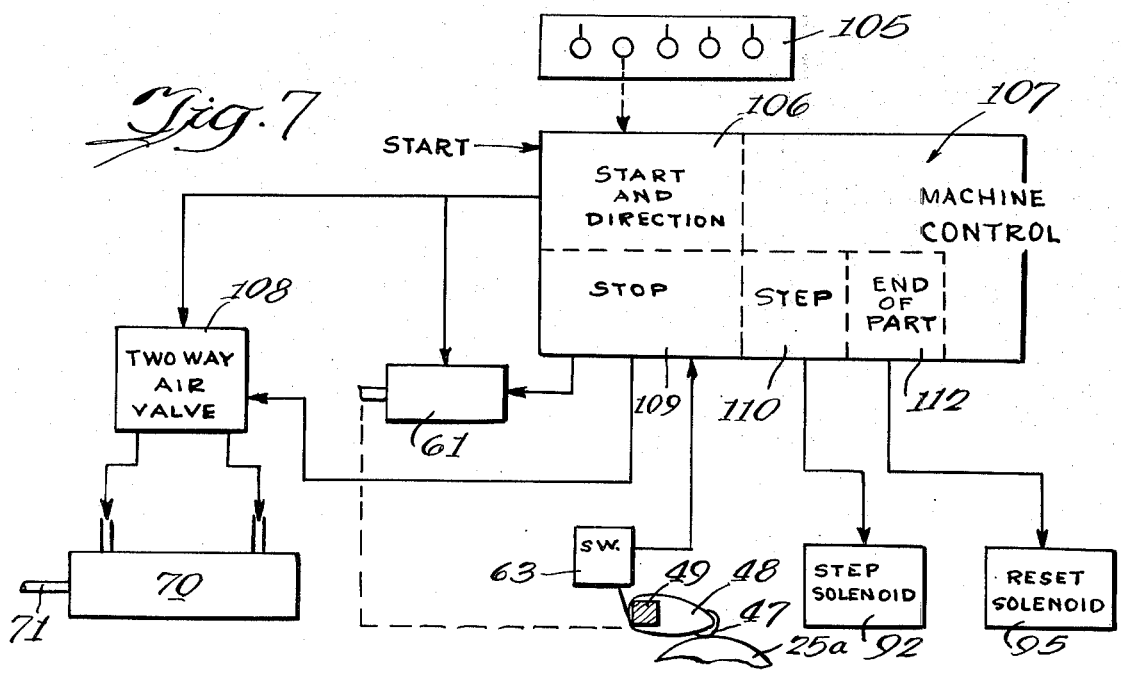
FIG. 7 is a block diagram illustrating various elements of a machine control utilizing the invention.

A switch 63, illustrated diagrammatically in FIG. 7, is actuated by index shaft 49 and provides a signal for the machine control, as will appear.

Referring particularly to FIG. 5, together with FIGS. 2 and 3, the start mechanism 32 for shifting helical gear 27 axially will be described. The helical gear 27 is slidably mounted on a spline section 23a of valve feedback shaft 23. A two-way air cylinder 70 has a piston 71 connected with a pivoted yoke 72 having spaced arms 73 which embrace the hub of helical gear 27. Rollers 74 at the ends of arm 73 are received in a peripheral groove 75 on the gear hub. Actuation of air cylinder 70 causes yoke 72 to pivot about pin 76 moving gear 27 on splines 23a. Each step in the operation is initiated with piston rod 71 at a central position so that it may move in either direction. Thus helical gear 27 may be shifted axially in either direction permitting selection of the direction of offset of cam shaft 26 and valve input shaft 22. This determines the direction of operation of motor 16. The extent of axial movement of helical gear 27 determines the offset angle which is established between input and feedback shafts 22, 23 and may be utilized as a hydraulic fluid flow rate control to determine the speed of operation of motor 16.

Air cylinder 70 remains actuated during execution of the machine element movement until cam roller 48 drops into the recess on the periphery of the selected cam.

Cam follower 33 (guide 53, arm 48 and roller 47) are moved along index and guide shafts 49, 55 from cam to cam as the program of movements is carried out. The follower starts at the left end of the series of cams as viewed in FIGS. 2 and 3 and is moved toward the right as the program progresses. At the end of the program the cam follower is returned to its starting point.

A reciprocating rack mechanism efects this step-bystep movement of the cam follower. A stationary rack 80 is mounted for vertical movement on a pair of screws 81 and is held upwardly against the screw heads by coil springs 82. The upper edge of stationary rack 80 is provided with teeth which cooperate with a fixed tooth 84 extending downwardly from carrier 53 to restrain the carrier against movement from right to left.

A reciprocating rack 86 is slidably mounted on stationary rack 80 and is urged toward the left in FIGS. 2 and 3, the right in FIG. 6, by coil spring 87. Teeth in the upper surface of reciprocating rack 86 engage a pawl 88 urged downwardly from the guide 53 by spring 89, FIG. 4.

Following each sequential movement of machine element 15, step solenoid 92 is momentarily energized, acting through link 93 to move reciprocating rack 86 to the left, FIG. 6. The engagement of the teeth of rack 86 with pawl 88 moves guide 53 to the left so that fixed tooth 84 engages the next tooth of stationary rack 80. solenoid 92 is then deenergized releasing link 93 and reciprocating rack 86 which return to the position shown in FIG. 6.

Upon completion of a series of movements of machine element 15, reset solenoid 95 is energized and acts through link 96 and crank 97 to depress both stationary rack 80 and reciprocating rack 86 against springs 82 below fixed tooth 84 and pawl 88. A cable 100 wound on spring drum 101 is connected with guide 53 and returns it to its starting position, at the left in FIGS. 2 and 3, when it is released from the rack mechanism.

A machine control utilizing the programmed cams is illustrated functionally in FIG. 7.

It is necessary to establish the direction of movement for each of the successive operations of the machine element. This is done by a series of two position switches 105 connected with a start and direction section 106 of machine control 107. A start signal from a suitable source, as a manual switch actuated by an operator, initiates the operation of the machine element and the appropriate switch 105 determines the direction of movement. A signal from start and direction section 106 of the control causes operation of a two-way air valve 108 to actuate two-way air cylinder 70 in the appropriate direction to establish the angular offset between input and feedback shafts 22, 23 for the desired movement of machine element 15. At the same time solenoid 61 is energized to bring roller 47 into engagement with the periphery of the selected cam 25a. When cam roller 47 drops into the recess 25c of cam 25a, switch 63 is actuated to operate the stop section 109 of the machine control. The stop section of the control causes two-way air valve 108 to release air cylinder 70 permitting helical gear 27 to return to its neutral position as motor 16 and machine element 15 drive feedback shaft 23 into alignment with input shaft 22. When this has been accomplished, solenoid 61 is released allowing spring 59 to lift arm 48. Thereafter, step solenoid is actuated to move guide 53 and arm 58 into alignment with the next cam. When all of the movement of the sequence have been completed an end of part signal from the control section 112 actuates reset solenoid 95.

Certain machine element movements, as the longitudinal movement of the carriage of a tube bending machine on the frame, must not exceed physical limits of the machine. Switches 115, 116 are actuated by pins 117, 118 extending outwardly from collars 119, 120 adjustably positioned on cam shaft 26. For a given machine element, the collars 119, 120 are set to actuate the limit switches and stop the machine element movement before the mechanical limits are reached.

The angular position of the cams 25a on the cam shaft may be adjusted by operating the machine manually to move the machine element through its desired sequence positions. At each position of the machine element the appropriate cam is aligned with roller 47 in recess 25c and the cam secured to the cam shaft. This operation is carried out with air cylinder 70 and helical gear 27 in their centered or neutral positions.

I claim:

1. A cam programmed control for a motor moving a machine element to a predetermined position, comprising:

means for controlling the delivery of power from a power source to said motor, said power control means having first and second rotatable control shafts, the delivery of power from said source to said motor being a function of the angular offset between said shafts;

a rotatable cam shaft;

a position control cam on said cam shaft;

means connecting said motor and machine element with said first control shaft;

means connecting said cam shaft with said first and second control shafts for transmitting motion from said motor, machine element and first control shaft to said cam shaft and said second control shaft;

start means for moving one control shaft with respect to the other control shaft to establish an offset therebetween whereby the power delivery control means delivers power from said source to said motor and the motor drives the machine element, the first control shaft, the cam shaft and the second control shaft therewith, maintaining the offset between the control shafts; and a cam follower associated with said cam and engaging the cam to stop said cam shaft and said second control shaft at a predetermined position, said motor continuing to drive said machine element and turn said first control shaft to reduce the angle of offset between said first and second control shafts to zero.

2. The cam control of claim 1 in which said first control shaft and said cam shaft are interconnected through helical gears, one of said helical gears being mounted on its shaft through elongated splines, longitudinal movement of said one helical gear establishing the offset between said control shafts.

3. The cam control of claim 1 in which said movable cam is movable in either direction from a neutral position, the direction of movement of the gear determining the direction of angular offset between said control shafts and the direction in which said motor drives said machine element.

4. The cam control of claim 2 in which said start means includes an air cylinder connected with said helical gear to move it axially on said shaft.

5. The cam control of claim 4 in which said air cylinder is energized until said cam is stopped by said cam follower and is then deenergized, movement of said motor after the cam is stopped returning said helical gear to its neutral position and said control shafts to alignment.

6. The cam control of claim 1 having plural cams and means for selecting one of said plural cams to control the machine element movement.

7. The cam control of claim 6 including means responsive to completion of one machine element movement to step said cam follower to the next cam.

8. A cam programmed control for a motor which moves a machine element sequentially to each of a plurality of positions, comprising:
means for controlling delivery of power from a power source to said motor to move the machine element;
a plurality of cams;
means connecting said cams with said motor and machine element for rotation in accordance with the position of said machine element;
a cam follower operatively associated with a selected cam;
means responsive to said cam follower for terminating delivery of power to said motor in accordance with the position of the selected cam; and
means for moving said cam follower successively to each of said plurality of cams to control successive movements of said machine element.

9. The motor control of claim 8 in which said cams are aligned on a cam shaft, said cam follower being moved in a path parallel with said cam shaft.

10. The motor control of claim 9 having a follower shaft parallel with said cam shaft, said cam follower being slidably mounted on said shaft.

11. The motor control of claim 10 in which the shaft on which the followr is slidably mounted has a noncircular cross-section and is rotatable in accordance with rotation of said cam, said control including switch means responsive to the angular position of said follower shaft to indicate the position of the follower with respect to a cam.

12. The motor control of claim 9 including spring means urging said cam follower in one direction parallel to said cam shaft and a reciprocating toothed rack to move said cam follower step by step in the opposite direction, each step of the toothed rack corresponding with a cam on said cam shaft.

13. The motor control of claim 12 including a solenoid for actuating said reciprocating rack and means responsive to the completion of a movement of the machine element for actuating said solenoid.

14. The motor control of claim 12 including a stationary rack for holding the cam follower during return movement of the reciprocating rack.

15. The motor control of claim 14 including a solenoid for retracting said stationary rack to release said cam follower to be returned to a starting position by said spring means, and means responsive to the completion of a sequence of movements of said machine element to actuate said release solenoid.

16. The motor control of claim 8 including means to lift said cam follower from the selected cam upon completion of a movement of said machine element.

17. The motor control of claim 11 including means to lift said cam follower from the selected cam upon completion of a movement of said machine element.

18. The motor control of claim 17 including a solenoid connected with said cam follower and operative to move it into engagement with the surface of a selected cam, and a spring connected with said cam follower to lift it from a cam, a circuit for energizing said solenoid and means responsive to completion of a movement of the machine element for interrupting said solenoid circuit.

19. A cam programmed control for a hydraulic motor moving a machine element to a predetermined position, comprising:
a rotary mechanical servo valve for controlling the delivery of hydraulic fluid from a source to said motor, said valve having a housing with coaxial input and feedback shafts extending from opposite ends, the existence of an angular offset between said input and feedback shafts causing hydraulic fluid to be delivered through said valve to said motor;
a rotatable cam shaft parallel to said input and feedback shafts;
means connecting said motor and machine element to the feedback shaft of said valve;
a first helical gear slidably splined to said feedback shaft;
a second helical gear on said cam shaft and meshed with said first helical gear;
a plurality of cams on said cam shaft;
a pair of gears connecting said cam shaft with said input shaft;
means to shift said first helical gear axially of said feedback shaft, causing rotation of the cams and the input shaft to deliver hydraulic fluid to said motor, said shifting means holding said first helical gear in shifted position, said hydraulic motor driving the machine element and said feedback, cam and input shafts;
a cam follower operatively associated with a selected cam, said cam and follower having interengaging surfaces which stop rotation of the cam and input shafts; and means responsive to said cam follower upon engagement of said follower and cam surfaces to release said first helical gear from its shifted position, continued movement of the motor and machine element returning said first helical gear to its unshifted position with said input and feedback shafts aligned, ending movement of said machine element.

20. The motor control of claim 19 in which the means to shift said first helical gear is operable to shift it in either direction from a neutral position to cause operation of said hydraulic motor in one of two directions.

21. The motor control of claim 20 in which the means for shifting the first helical gear includes an air cylinder operable from a central position in either direction.

22. The motor control of claim 19 including means operative following completion of the movement of said machine element to move said cam follower out of operative association with respect to said cam shaft.

23. The motor control of claim 22 in which said cam follower moving means includes means operative to lift said cam follower from the selected cam and means operative after such lifting to shift the cam follower to a position adjacent another cam.

24. The motor control of claim 23 in which said cams are aligned on said cam shaft and the means for shifting the cam follower from cam to cam includes a reciprocating rack.

25. The motor control of claim 24 including spring means urging said cam follower toward a starting position and means for releasing the cam follower from said rack.

26. The motor control of claim 19 in which said cam has a surface engageable with said follower to indicate the end of the movement of said machine element, each of said cams being circular and the angular position of the cam surface of each cam with respect to said cam shaft being adjustable independent of the positions of the surfaces of the other cams.

* * * * *